United States Patent [19]

Briggs

[11] 3,733,907
[45] May 22, 1973

[54] VALVE STRUCTURE FOR COLLECTING MULTIPLE SAMPLES

[75] Inventor: Walton Ellis Briggs, Lynnfield, Mass.

[73] Assignee: Varian Associates, Palo Alto, Calif.

[22] Filed: Jan. 24, 1972

[21] Appl. No.: 220,123

[52] U.S. Cl. .......73/421.5 R, 73/422 GC, 250/41.95
[51] Int. Cl. ................................................G01n 1/22
[58] Field of Search .....................73/40.7, 421.5 R, 73/422 GC; 250/41.95

[56] References Cited

UNITED STATES PATENTS

| | | | |
|---|---|---|---|
| 2,702,479 | 2/1955 | Black et al. | 73/422 GC |
| 3,014,128 | 12/1961 | Taubert | 73/425.6 |

*Primary Examiner*—S. Clement Swisher
*Attorney*—Stanley Z. Cole and Leon F. Herbert

[57] ABSTRACT

A valve structure for collecting multiple samples of a fluid comprises a housing forming an inlet chamber and an outlet chamber separated by a valve seat partition between the chambers. The partition has a first central passage therethrough and a second passage therethrough radially outward of the first passage. A valve is located in the inlet chamber and seats against the partition to close one side of each of said passages. In the outlet chamber a first valve seats against the partition to close the other end of said center passage. A third valve is located in said outlet chamber to seat against said partition and close the other end of said outward passage. The first valve has an annular recess in its face which communicates with said outward passage and together with said outward passage forms a large sample collecting volume. The center passage forms a small sample collecting volume. Means are provided for opening and then closing the first valve to fill both of said sample collecting volumes with sample gas while the second and third valves are closed. The operating structure then provides for opening the second valve to release the small sample collecting volume for transmission to a leak detector. If the small volume does not contain enough leak gas to register on the leak detector, the third valve is opened to release the large sample collecting volume to the leak detector.

9 Claims, 3 Drawing Figures

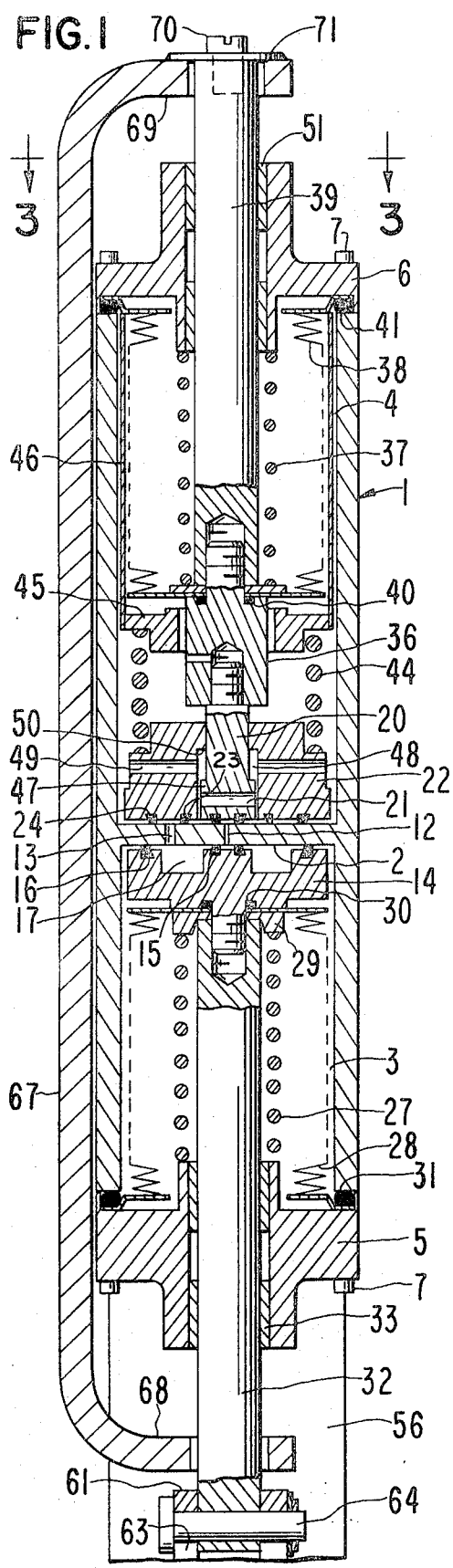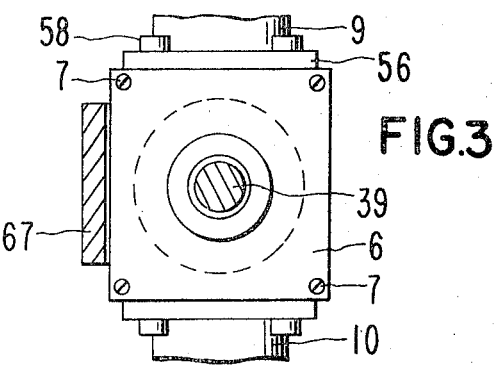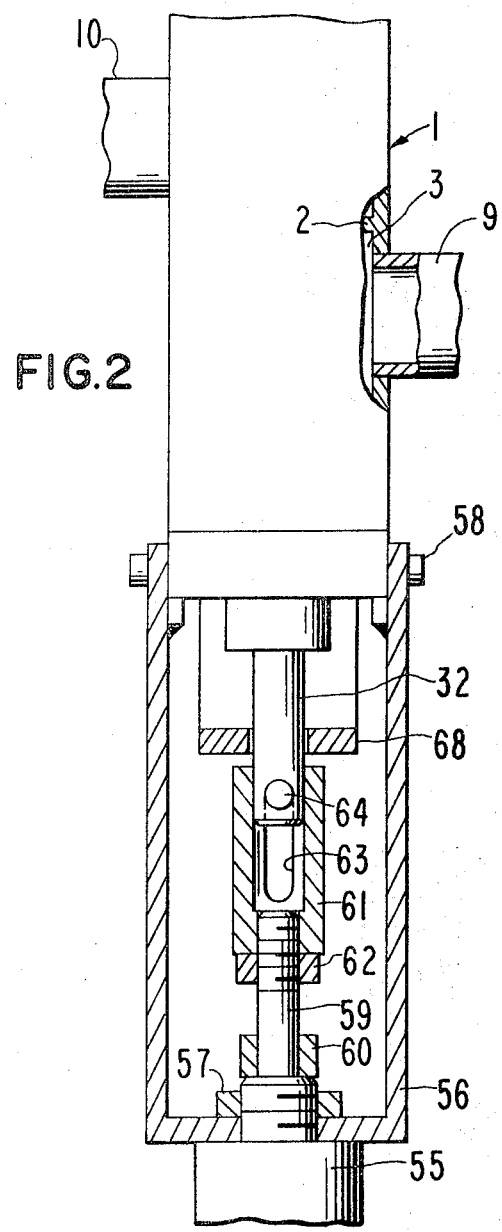

VALVE STRUCTURE FOR COLLECTING MULTIPLE SAMPLES

BACKGROUND OF THE INVENTION

1. Field of the Invention

This invention is an improvement in the field of sample valve assemblies for detecting leaks in test pieces.

2. Description of the Prior Art

In the field of leak testing it is customary to expose one side of a test piece to a test gas, usually helium, and create a vacuum in a conduit on the other side of the test piece. The vacuum conduit is then exposed to a leak detector which is designed to give a signal indicative of the amount of helium which has leaked through the test piece. It has previously been proposed to insert a structure for collecting two different sized test volumes between the test piece and the leak detector. The purpose is to collect a small test volume and a larger test volume and then first deliver the small test volume to the leak detector and if no leak is shown to next deliver the large test volume. The purpose is to protect the delicate leak detector from exposure to an excessive amount of test gas, such as helium, in the event of a gross leak and at the same time to be able to detect a fine leak. In the past it has been proposed to collect the two different size sample volumes by placing three valves in a line with the center valve closer to one of the end valves, or to provide a pair of two valve structures in parallel with one of the structures having a larger collection volume than the other structure. These prior approaches and the overall leak detecting system are disclosed in U. S. Pat. application No. 183,495 filed Sept. 24, 1971 and assigned to the same assignee as the present invention. Although the prior approaches are satisfactorily operative, they do not provide the simplicity, small size and fail safe features of the present invention as will hereinafter be described.

SUMMARY OF THE INVENTION

The object of the present invention is to provide a valve assembly for collecting two different size fixed volumes of sample gas in a simple compact structure having fail safe features, and so arranged that the small sample volume will be released first to the leak detector and if no leak is shown, then the larger volume will be released to the leak detector.

The objects of the invention are achieved in a single valve assembly which comprises a body forming an inlet chamber and an outlet chamber separated by a partition wall. The wall has a central passage therethrough and a second passage therethrough outwardly of the first. A valve is located in the inlet chamber for seating against the partition wall to close one side of both of the passages. A second valve is located in the outlet chamber for seating against the partition wall to close the other side of the center passage, and a third valve is located in the outlet chamber for closing the other side of the outward passage. In the preferred embodiment, the first valve has an annular recess in its face which communicates with the outward passage to form a fixed collection volume which is substantially larger than the volume formed by the center passage. Operating means are provided for first opening and then closing the first valve so that the sample gas is trapped in both of the fixed volumes. Next the actuating mechanism opens the second valve to release the collected small volume to the outlet chamber and thence to a leak detector. Assuming no leak is detected from the small volume, continued motion of the actuating mechanism opens the third valve to release the large collected sample volume to the outlet chamber and thence to the leak detector.

BRIEF DESCRIPTION OF THE DRAWINGS

FIG. 1 is a cross-sectional view of the valve assembly of the invention;

FIG. 2 is an elevational view on reduced scale, partly in section, taken from the right of FIG. 1 and showing the air cylinder drive motor; and FIG. 3 is a top view taken on the line 3—3 of FIG. 1.

DETAILED DESCRIPTION OF THE INVENTION

The valve assembly comprises a main body 1 having a partition wall 2 which separates the body into an inlet chamber 3 and an outlet chamber 4. The inlet chamber is closed by an end cap 5 and the outlet chamber is closed by an end cap 6 which are held in place by screws 7. The preferred use of the valve assembly is in connection with leak detection. The inlet chamber 3 is provided with an inlet pipe 9, and the outlet chamber is provided with an outlet pipe 10. In the preferred use the inlet and outlet pipes are connected to a conventional leak detecting system. More specifically, pipe 9 is connected to one side of the work piece being leak checked and to the associated vacuum pump. The other side of the work piece is exposed to helium and if there is a leak, helium will be present in inlet pipe 9. Outlet pipe 10 is connected to a conventional leak detector and its associated vacuum pump.

The partition 2 is provided with a central passage 12 therethrough and a radially outer larger passage 13. The inlet chamber 3 is provided with a valve 14 having an O-ring 15 which sealingly closes one end of passage 12, and an O-ring 16 which sealingly closes the passage 13. The upper face of valve 14 has an annular recess 17 which together with passage 13 provides a sample collecting volume which is many times larger than the volume formed by passage 12. For example, the volume formed by passage 13 and recess 17 is preferably 100 to 1,000 times larger than the volume of passage 12. Obviously, the larger volume can be formed by making passage 13 much larger than is shown and eliminating recess 17, or recess 17 can be enlarged and passage 13 can be smaller. However, the preferred construction is as shown in FIG. 1. The outlet chamber 4 is provided with a valve 20 having an O-ring 21 which seals the upper end of passage 12. An additional valve 22 surrounds valve 20 and is provided with O-rings 23 and 24 which seal the upper end of passage 13.

Returning to the valve structure in inlet chamber 3, it will be seen that the valve 14 is normally held in its closed position by spring 27. A conventional vacuum-tight bellows 28 is secured to the lower end of valve 14 in vacuum-tight manner by means of a nut 29 and O-ring 30. The lower end of bellows 28 is sealed by O-ring 31. Valve 14 is moved downwardly by actuating rod 32 which is threadedly secured to the bottom of the valve and moves vertically in a bearing 33.

Referring to the valve structure in outlet chamber 4 it will be seen that the valve 20 is attached to a threaded connector 36 and held in normally closed position by a spring 37. The outlet chamber is sealed by a vacuum bellows 38. Valve 20 is moved upwardly to open position by an actuating rod 39 threaded on connector 36. The lower end of bellows 38 is sealed to connector 36 by 0-ring 40. The upper end of bellows 38 is sealed by 0-ring 41. Valve 22 is held in normally closed position by a spring 44. The upper end of spring 44 abuts a retaining collar 45 which is held in fixed position by a thin cylinder 46 that abuts the upper end of bellows 38. The lower end of cylinder 46 is welded to collar 45. The lower end of valve 20 has an enlarged portion 47 received with a loose fit in a recess 48 in valve 22 so that when valve 20 raises, gas in passage 12 will pass upwardly around valve 20 and into the outlet chamber 4 through passages 49 in valve 22. The upper end of recess 48 provides a shoulder 50 which is engaged by the upper rim of the enlarged lower portion of valve 20 for the purpose of causing upward opening movement of valve 22. The upper smaller end of valve 20 is received with a sliding fit in the upper end of valve 22. The upper end of actuating rod 39 is received in a bearing 51. The enlarged portion 47 of valve 20 has a horizontal bore (unnumbered) which will align with bores 49 for insertion of a rod to screw valve 20 to connector 36 during assembly.

The valve assembly is preferably operated by a conventional cylinder and piston unit 55 which is supported by a bracket 56 to which it is secured by a nut 57. Bracket 56 is attached to the valve body 1 by means of screws 58. The cylinder and piston unit has a drive rod 59 surrounded by a spacer collar 60. The upper end of rod 59 is threaded into the lower end of a cylindrical lost-motion connector 61 and held tightly by a lock nut 62. Opposite sides of connector 61 contain guide slots 63. The lower end of actuating rod 32 is slidingly received in connector 61 and is held within the connector by a pin 64 which slides along the slots 63. An actuator bar 67 has an inturned lower end 68 which surrounds the actuating rod 32 with a loose fit and is adapted for abutment by the upper end of connector 61. The upper end of bar 67 has an inturned portion 69 having an oversized bore in which the upper end of actuating rod 39 is received. The upper end of bar 67 has an inturned end 69 which is rigidly but removably attached to actuating rod 39 as by means of a screw 70 received through a washer 71 and threaded into actuating rod 39. The washer 71 is welded to the upper end 69 of the bar 67.

The operation of the valve assembly is as follows. As shown in the drawings, the valves 14, 20 and 22 are in their neutral or closed positions. As previously mentioned the preferred use of the valve assembly is in leak detection systems in which inlet pipe 9 is connected to one side of a test piece and a vacuum pump creates a vacuum in pipe 9. At this time the other side of the test piece is exposed to helium gas. If there is a leak in the test piece, helium gas will be present in pipe 9 and in the inlet chamber 3. At this stage the air driven cylinder and piston unit 55 is operated to lower the drive rod 59. The downward movement of the rod will cause connector 61 to engage pin 64 and lower the actuating rod 32 to open valve 14 so that the sample gas will enter passages 12 and 13 and the recess 17. Then the motion of drive rod 59 is reversed. The initial upward movement permits valve 14 to be closed by spring 27, trapping the gas sample in passage 12 and in the volume formed by passage 13 and recess 17. Continued upward movement of rod 59 causes the upper end of connector 61 to engage the lower end 68 of actuating bar 67. This upward movement will first raise valve 20 so that the test volume in passage 12 will pass through outlet pipe 10 to the conventional leak detector. If the leak detector does not signal a leak, the drive rod 59 will be permitted to continue its upward movement which will cause the enlarged portion 47 of valve 20 to engage shoulder 50 and raise the valve 22 so that sample gas in the volume formed by passage 13 and recess 17 will pass through the outlet pipe 10 to the leak detector. The cylinder and piston drive unit can be operated manually or by an automatic circuit controlled by the leak detector. In either case the purpose is to protect the leak detector from a large concentration of helium which would result if there were a gross leak in the test piece and the large sample volume formed by passage 13 and recess 17 were communicated to the leak detector. Thus, if the small sample volume in passage 12 contains enough helium to register a leak on the leak detector, it is important that the upward movement of valve 20 be discontinued before the valve 22 is opened. The valve assembly has built-in fail safe features in that there is no way to open valve 14 while valves 20 and 22 are open. Thus, there is no way to create an undesirable continuous passage for the leak gas to flow from inlet pipe 9 through outlet pipe 10 and thence to the leak detector. In case of air failure to the cylinder 55 or power failure, all of the valves close by reason of the springs 27, 37 and 44.

What is claimed is:

1. Valve structure for collecting multiple samples, comprising a housing forming two valve chambers and a partition between said chambers, said partition having first and second passages therethrough, a first valve in a first one of said chambers seating against said partition to close one side of each of said first and second passages, a second valve in the second one of said chambers seating against said partition to close the other side of said first passage, and a third valve in said second chamber seating against said partition to close the other side of said second passage.

2. A valve structure as claimed in claim 1 in which said first valve has a recess in its face which communicates with said second passage and together with said second passage forms a sample collecting volume which is larger than the volume of said first passage.

3. A valve structure as claimed in claim 1 in which one of said passages is larger than the other.

4. A valve structure as claimed in claim 1 in which one of said valve chambers is an inlet chamber and the other is an outlet chamber, said first valve is in said inlet chamber and said second and third valves are in said outlet chamber, said first passage is centrally located in said partition and said second passage is located radially outward of the first passage, said second valve closes said first passage and said third valve closes said second passage, said second valve being slidingly received in said third valve, abutment means on said third valve engageable by abutment means on said second valve to open said third valve upon opening movement of the second valve beyond initial opening movement of the second valve.

5. A valve structure as claimed in claim 4 further comprising a first actuating rod attached to said first valve, a connector attached to said first actuating rod by a lost motion connection, a second actuating rod connected to said second valve, an actuator bar connected to said second actuating rod, and said actuator bar being engageable by said connector when said connector moves relative to said first actuating rod.

6. A valve structure as claimed in claim 5 in which said three valves are all biased to closed position by springs.

7. A valve structure as claimed in claim 1 in which means are provided for opening said first valve while said second and third valves are closed and for sequentially opening said second and third valves while said first valve is closed.

8. A valve structure as claimed in claim 7 in which said three valves are all biased to closed positions by springs.

9. A valve structure as claimed in claim 8 in which said first and second valves are interconnected by a lost motion connection and said second and third valves are interconnected by a lost motion connection.

* * * * *